(12) United States Patent
Florit et al.

(10) Patent No.: US 8,050,183 B2
(45) Date of Patent: Nov. 1, 2011

(54) SYSTEM AND METHOD FOR IMPLEMENTING REFLECTOR PORTS WITHIN HIERARCHICAL NETWORKS

(75) Inventors: Lionel Florit, Greenbrae, CA (US); Robert W. Klessig, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 11/124,462

(22) Filed: May 6, 2005

(65) Prior Publication Data
US 2006/0250969 A1 Nov. 9, 2006

(51) Int. Cl.
*H04L 12/26* (2006.01)
(52) U.S. Cl. ........ 370/248; 370/241; 370/242; 370/249; 370/252
(58) Field of Classification Search ........ 370/216, 370/242, 248, 249, 252
See application file for complete search history.

(56) References Cited

U.S. PATENT DOCUMENTS

| | | | |
|---|---|---|---|
| 6,370,146 B1 | 4/2002 | Higgins et al. | 370/400 |
| 6,373,826 B1* | 4/2002 | Russell et al. | 370/256 |
| 7,355,965 B2* | 4/2008 | Griswold et al. | 370/216 |
| 2003/0165119 A1 | 9/2003 | Hsu et al. | 370/258 |
| 2004/0153558 A1* | 8/2004 | Gunduc et al. | 709/229 |
| 2005/0053073 A1 | 3/2005 | Kloth et al. | 370/395 |
| 2006/0259619 A1* | 11/2006 | Chang et al. | 709/224 |

FOREIGN PATENT DOCUMENTS

DE 10207529 9/2003

OTHER PUBLICATIONS

Cisco Systems, White Paper "Spanning Tree Protocol—Understanding Rapid Spanning Tree Protocol," Mar. 4, 2005, 10 pages, http://www.cisco.com/en/US/tech/tk389/tk621/technologies_white_paper09186a0080094cfa.shtml.
N. Slabakov, Riverstone Networks, #131 Technology White Paper "Spanning Tree: Death is Not an Option," Jan. 2002, pp. 1-9.
International Search Report dated Sep. 13, 2006 for International Application No. PCT/US2006/016239, International Filing Date Apr. 28, 2006, 3 pp.

* cited by examiner

*Primary Examiner* — Luat Phung
(74) *Attorney, Agent, or Firm* — Campbell Stephenson LLP

(57) ABSTRACT

In some ring protocols, control messages are exchanged among ring nodes in order to implement certain behaviors, such as loop-free behavior and/or failure recovery, within the ring. A segment of a ring can be replaced by another network, effectively turning the ring into a daisy chain. If the intervening network does not allow transmission of the control messages used by the ring protocol, certain control messages may be blocked, causing the ring to operate in undesirable ways. Reflector ports can be implemented at each end of the daisy chain in order to prevent these control messages from being blocked.

15 Claims, 10 Drawing Sheets

SYSTEM AND METHOD FOR IMPLEMENTING REFLECTOR PORTS WITHIN HIERARCHICAL NETWORKS

FIELD OF THE INVENTION

This invention relates to networking and, more particularly, to preventing loops within a hierarchy of networks that includes a ring network.

DESCRIPTION OF THE RELATED ART

An important trend in networking is the migration of packet-based technologies from local area networks (LANs) to metropolitan area networks (MANs). In the simplest terms, a MAN is a network that spans a metropolitan area. Generally, a MAN spans a larger geographic area than a LAN, but a smaller geographic area than a wide area network (WAN). The rapidly increasing volume of data traffic in MANs is challenging the capacity limits of existing transport infrastructures based on circuit-oriented technologies such as SONET, SDH, and ATM. Inefficiencies associated with carrying increasing quantities of data traffic over voice-optimized circuit-switched networks makes it difficult to provision new services and increases the cost of building additional capacity beyond the limits of most carriers' capital expense budgets. Packet based transport technology is considered by many to be one of the best alternatives for scaling metropolitan networks to meet the demand. Accordingly, MANs implemented using packet-based transport technologies such as Ethernet are gaining popularity. Ethernet-based MANs are referred to as Metro Ethernet Networks (MENs).

Ring topology networks can be used within MENs. There are several situations involving ring topologies in which packet forwarding loops can arise. For example, when several rings are connected, two or more switches are often included at the connection point in order to increase redundancy. The use of redundant switches creates loops. Spanning Tree Protocol (STP) can be used to logically prevent loops within a network that includes physical loops. However, STP is not optimized for rings. In particular, convergence time under STP in a ring network may take several seconds. Accordingly, alternatives to STP that can be implemented in ring networks are desirable.

BRIEF DESCRIPTION OF THE DRAWINGS

A more complete understanding of the present invention may be acquired by referring to the following description and the accompanying drawings, in which like reference numbers indicate like features.

Figure 1:
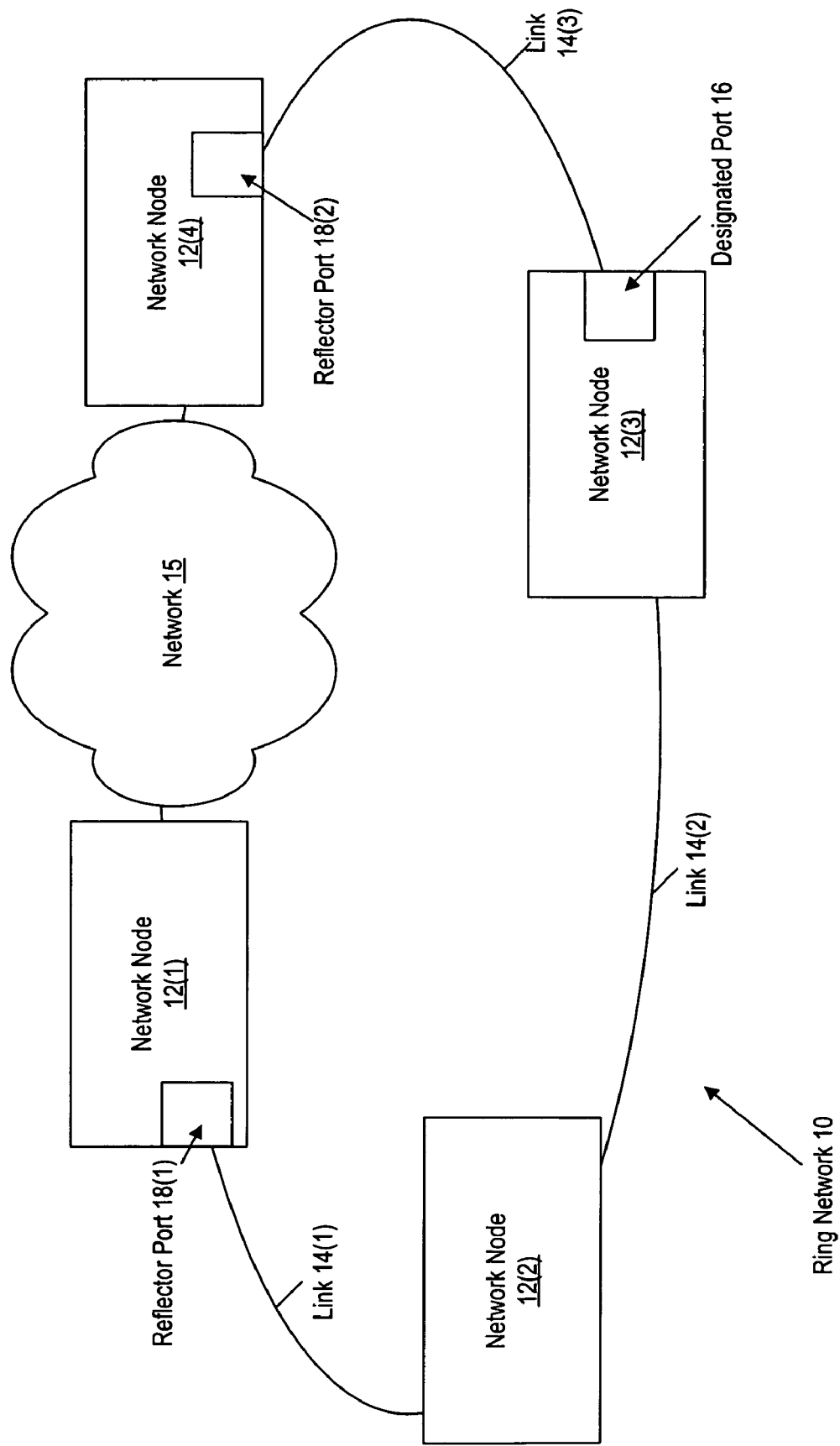
FIG. 1 shows an example of a daisy chain network that includes a network device with a reflector port, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows an example of a ring network that includes two network devices that each include a reflector port. As shown, ring 10 includes network nodes 12(1)-12(4) as well as links 14(1)-14(3). Ring 10 is incomplete, since there is no link between network nodes 12(1) and 12(4). Instead, network nodes 12(1) and 12(4) are communicatively coupled by another network 15. Ring 10 and network 15 form a hierarchical arrangement of networks, in which ring 10 is the lower network in the hierarchy.

Network 15 can be implemented using a variety of different topologies, including ring, mesh, star, and tree topologies. Since ring 10 is an incomplete ring that includes nodes that are interconnected in a serial manner, ring 10 can also be described as a daisy chain. The daisy chain shown in FIG. 1 has network node 12(1) at one end of the daisy chain and network node 12(4) at the other end.

As shown, ring 10 includes several network nodes 12(1)-12(4). These network nodes are network devices such as switches, routers, and/or bridges that perform Ethernet switching, routing, and/or bridging of messages. Network nodes 12(1)-12(4) can act as part of an access network that provides customers and/or end-users with access to a network (e.g., the Internet). In such a situation, one or more of the network nodes can be coupled to customer devices (e.g., routers and/or switches) and/or end-user devices such as hosts. Additionally, network nodes 12(1)-12(4) can be coupled to network equipment that interconnects one or more access networks with a network.

Ring 10 includes network nodes 12(1)-12(4) and several links 14(1)-14(3) that interconnect network nodes 12(1)-12(4). Each link 14(1)-14(3) can provide bidirectional communication between a pair of network nodes. For example, link 14(1) conveys messages between network nodes 12(1) and 12(2). Similarly, link 14(2) conveys messages between network nodes 12(2) and 12(3), and link 14(3) conveys messages between network nodes 12(3) and 12(4).

Network nodes 12(1) and 12(4), which are coupled by network 15, can also implement a communication protocol that is appropriate for communicating via network 15. When network node 12(1) sends a message to network node 12(4)

via network 15, or vice versa, the message is sent in a manner that is consistent with the communication protocol used in network 15.

Network nodes 12(1)-12(4) implement a ring protocol when communicating via links 14(1)-14(3) of ring 10. This ring protocol logically breaks the loop formed by the combination of ring 10 and network 15. In other words, the ring protocol causes ring 10 to behave as if there is a communication break within ring 10. The ring protocol causes this behavior by blocking data traffic at one point in the ring. In this example, the ring protocol selects a "designated port" to block data traffic. The ring protocol is implemented by exchanging ring protocol control messages among network nodes within the ring. These ring protocol control messages are used to detect continuity and connectivity within the ring, to select a designated port, to detect failures within the ring, to cause the designated port to block when the loop is complete, and to cause the designated port to unblock in response to detecting a failure within the ring. Ring protocol control messages for ring 10 cannot be sent between network nodes 12(1) and 12(4) via network 15.

Each network node includes up to two ring ports that are configured to operate as part of ring 10. A ring port is an interface that is coupled to a link and configured to send ring protocol control messages. Normally, a network node includes a pair of ring ports for each ring in which the network node participates.

Data messages that are received on one ring port and that are not destined for the receiving network node are sent via the other ring port in the pair. Ring protocol control messages are detected by ring ports and processed by the network node. For example, in response to receiving a ring protocol control message, the receiving ring port can generate an interrupt that causes a processor within the network node to handle the ring protocol control message. In response to processing a ring protocol control message, the network node can generate a ring protocol control message, which may simply be a copy of the received ring protocol control message, to send from the receiving ring port (e.g., in response to the ring protocol control message) or from the paired ring port (e.g., if the ring protocol control message is being sent around the ring).

As shown in FIG. 1, a port within network node 12(3) has been selected to be a designated port. Designated port 16 blocks data traffic received via link 14(3) from being sent via link 14(2). Similarly, traffic received by network node 12(3) via link 14(2) and sent to designated port 16 will not be sent on link 14(3). Designated port 16 also routinely (i.e., in a routine manner, e.g., periodically or in response to predesignated stimuli) uses (e.g., by sending, receiving, and/or processing) ring protocol control messages in order to detect whether a failure has occurred within ring 10. If a failure is detected, designated port 16 will unblock and allow data traffic to pass from link 14(3) to link 14(2) (and vice versa) via network node 12(3). By blocking data traffic when a complete ring is detected, designated port 16 provides a mechanism for preventing loops in network 15 and ring 10 without using spanning tree within ring 10.

The ring protocol is implemented so that designated port 16 can detect failures within ring 10 by attempting to send ring protocol control messages in either direction on the ring. The ring protocol control messages are a type of ring protocol control message that is sent around the ring, such that if the ring is free from failures, both messages will be returned to designated port 16 within a predesignated amount of time. Accordingly, if designated port 16 receives the two messages back within the predesignated amount of time, designated port 16 determines that ring 10 is complete. In this situation, designated port 16 determines that, since the ring is complete, designated port 16 should continue to block data traffic to prevent loops.

If instead designated port 16 does not receive the two messages back within the predesignated time, designated port 16 determines that a failure has occurred within the ring. In response to detecting that a failure has occurred, designated port 16 unblocks, allowing data traffic to pass from link 14(3) to link 14(2) via network node 12(3). Designated port 16 can continue to routinely send a pair of ring protocol control messages (one in each direction) in order to detect whether the failure within the ring has been repaired (and thus whether the designated port should begin blocking data traffic again).

Thus, the ring protocol operates to prevent loops within ring 10 by selectively causing designated port 16 to block data traffic. However, in the example of FIG. 1, ring 10 is not complete, since network nodes 12(1) and 12(4) are coupled by network 15, which does not support the ring protocol. Accordingly, without the use of the reflector ports described below, when designated port 16 sends the pair of ring protocol control messages in either direction, the messages will be unable to traverse network 15. As a result, the messages will not be returned to designated port 16, causing designated port 16 to unblock. This in turn creates a loop, which can result in messages being continuously circulated through ring network 10 and network 15.

In order to allow the ring protocol to treat ring 10 as a complete ring (and thus cause the designated port to block data traffic within the ring), the ports within network nodes 12(2) and 12(4) that are coupled to the ring are configured as a special type of port, referred to herein as "reflector ports." As shown, network node 12(1) includes reflector port 18(1), and network node 12(4) includes reflector port 18(2). Reflector ports 18(1) and 18(2) are collectively referred to as reflector ports 18.

Reflector ports 18 are implemented at each end of the daisy chain included in ring 10. When a ring protocol control message that should be returned to designated port 16 is received by a reflector port, the message is resent, from the reflector port, back towards designated port 16. Accordingly, if both reflector ports are reachable and working properly, both ring protocol control messages will be returned to designated port 16. This causes designated port 16 to see ring 10 as a complete ring and continue to block data traffic. Accordingly, loops can be prevented within ring 10, even though one segment of ring 10 has been replaced with network 15.

Because designated port 16 blocks data traffic (i.e., traffic that includes messages other than ring protocol control messages), data messages cannot be sent from network node 12(1) to network node 12(4) via ring 10. Instead, such data traffic must be sent via network 15.

Figure 2:
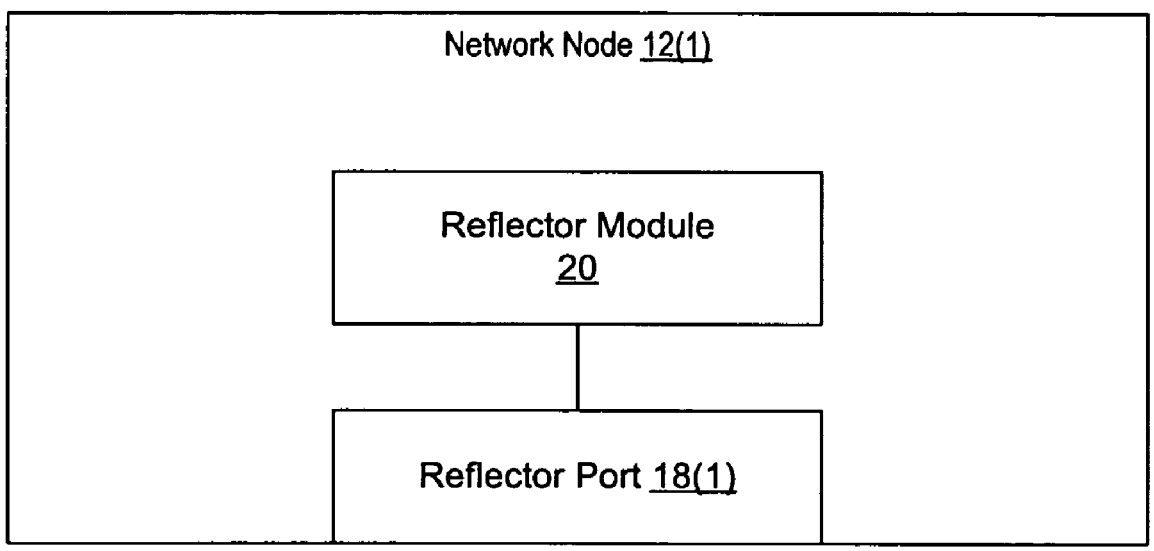
FIG. 2 is a block diagram of a network node, according to one embodiment of the present invention.

FIG. 2 illustrates a block diagram of network node 12(1). As shown, network node includes reflector port 18(1) and a reflector module 20. Reflector port 18(1) is a port that has been designated as a reflector port (e.g., by setting state information in a control register associated with the port). Reflector module 20 is a module that detects whether any ports within network node 12(1) have been specified as reflector ports and controls any reflector ports so that any received ring protocol control messages that need to traverse a healthy ring will be resent from the receiving reflector port.

Reflector port 18(1) can include one or more physical or logical interfaces. For example, in one embodiment, reflector port 18(1) can be a logical aggregate of several physical interfaces (e.g., the aggregated port can be operated according to a link aggregation protocol such as Port Aggregation Protocol (PAgP) or EtherChannel). Reflector module 20 can be implemented in hardware and/or software (e.g., reflector module 20 can be implemented in software that is executed by one or more processors within network node 12(1)).

When reflector port 18(1) receives a ring protocol control message that is of a type that should be sent around the ring, reflector port 18(1) notifies reflector module 20. For example, in response to receiving such a ring protocol control message, reflector port 18(1) can generate an interrupt that is provided to reflector module 20. In some embodiments, reflector port 18(1) generates such an interrupt for any ring protocol control message, and reflector module 18(1) determines whether the ring protocol control message is the type of message that is being sent around the ring to determine whether the ring is complete. In other embodiments, reflector port 18(1) only generates the interrupt for ring protocol control messages of the type that is sent around the ring in order to check for failures within the ring. For example, reflector port 18(1) can parse a received ring protocol control message in order to determine what type of ring protocol control message it is; depending on the type of the received ring protocol control message, reflector port 18(1) can selectively generate the interrupt.

In response to detecting that reflector port 18(1) has received a ring protocol control message that should be sent around the ring, reflector module 20 causes the ring protocol control message to be resent from reflector port 18(1). In some embodiments, reflector module 20 simply resends the same message that was received. In other embodiments, reflector module 20 can modify the ring protocol control message before resending it. For example, if the ring protocol control message includes information that specifies the direction (e.g., east or west) that the ring protocol control message is traveling in (relative to the designated port), reflector module 20 can modify this information (e.g., by replacing "east" with "west" or vice versa), so that the ring protocol control message will appear to have circumnavigated the ring when received by the designated port.

Figure 3:
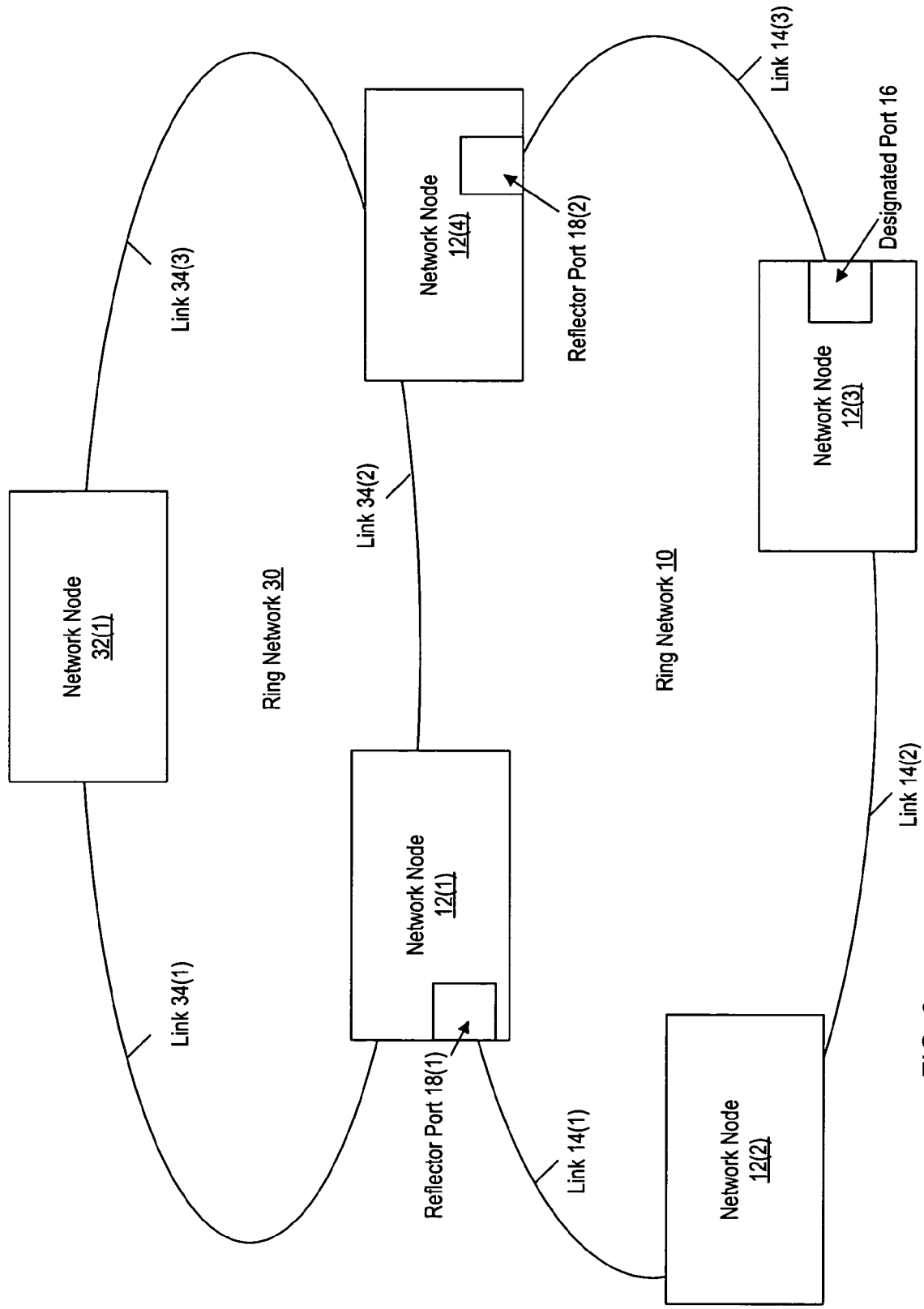
FIG. 3 shows a hierarchical arrangement of two ring networks, where the lowest ring in the hierarchy is incomplete, according to one embodiment of the present invention.

FIG. 3 shows another block diagram of a hierarchical arrangement of rings that includes ring network 10. In this example, a segment of ring network 10 has been replaced with another ring network, ring network 30. Ring network 30 can implement a different ring protocol than ring network 10.

Ring network 30 includes network nodes 32(1), 12(1), and 12(4) as well as ring network links 34(1), 34(2), and 34(3). Network node 32(1) is coupled to network node 12(1) by ring network link 34(1). Network node 32(1) is coupled to network node 12(4) by ring network link 34(3). Network nodes 12(1) and 12(4) are coupled by ring network link 34(2) of ring network 30.

Thus, a ring network link (link 34(2)) couples network nodes 12(1) and 12(4). However, since this network link is not part of ring network 10, it cannot be used to send ring protocol control messages for ring network 10. Accordingly, ring network 10 uses reflector ports 18(1) and 18(2) to "reflect" ring protocol control messages back into ring 10.

Figure 4:
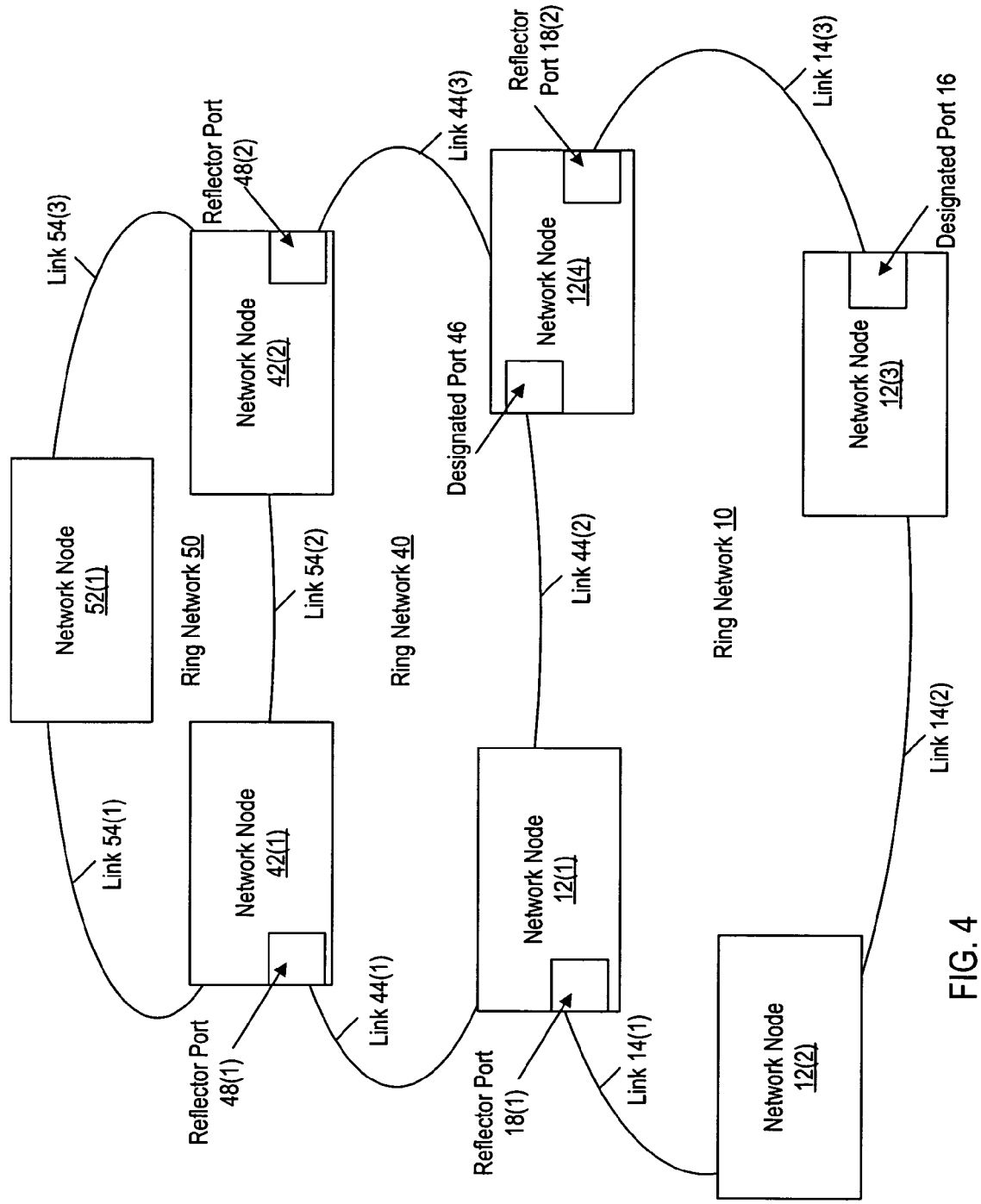
FIG. 4 illustrates a hierarchical arrangement of three ring networks, where the lowest ring in the hierarchy is incomplete, according to one embodiment of the present invention.

FIG. 4 illustrates a hierarchical arrangement of three ring networks. As in FIG. 2, a segment of ring 10 has been replaced with another ring, ring network 40. Similarly, a portion of ring network 40 has been replaced with a third ring, ring network 50.

Ring network 40 implements the same ring protocol as ring 10. However, since link 44(2) is part of ring 40 and not ring 10, ring protocol control messages for ring network 10 cannot be passed from network node 12(1) to network node 12(4) via link 44(2). In contrast, since link 44(2) is part of ring network 40, ring protocol control messages for ring network 40 can be passed via that link.

Ring network 40 includes network nodes 42(1), 12(1), 12(4), and 42(2), as well as links 44(1), 44(2), and 44(3). As this example shows, a network node can be part of several rings. For example, network node 12(1) can include a pair of ports that are configured as ring ports on ring network 40, as well as another port that is configured as a reflector port on ring network 10.

Since a portion of ring network 40 has been replaced with ring network 50, ring network 40 is incomplete. Network nodes 42(1) and 42(2) are located at each end of the daisy chain that makes up incomplete ring network 40. Like ring network 10, ring network 40 has specified a designated port 46, which logically breaks ring network 40 for purposes of data traffic, and a pair of reflector ports 48(1) and 48(2), which are located at the ends of the daisy chain that makes up incomplete ring network 40. Reflector ports 48(1) and 48(2) reflect certain types of ring protocol control messages, received from ring network 40, back into ring network 40. For example, in response to receiving a ring protocol control message via link 44(1), network node 42(1) can resend the ring protocol control message on link 44(1) via reflector port 48(1).

Ring network 50 includes network nodes 52(1), 42(1), and 42(2), as well as links 54(1), 54(2), and 54(3). Unlike ring networks 10 and 40, ring network 50 is complete. Accordingly, if ring network 50 implements a ring protocol that attempts to send ring protocol control messages around the ring in order to detect ring completeness, ring network 50 does not need reflector ports. It is noted that ring network 50 can implement a different ring protocol than ring networks 40 and 10.

As the example of FIG. 4 shows, a hierarchical arrangement of N ring networks can be implemented. Loops within such a network can be prevented, without using spanning tree protocol, by specifying a designated port and a pair of reflector ports within the lowermost N-1 rings of the N ring network hierarchy. The uppermost ring in the hierarchy (ring network 50 in FIG. 4) is complete, and thus may not need reflector ports.

Figure 5A:
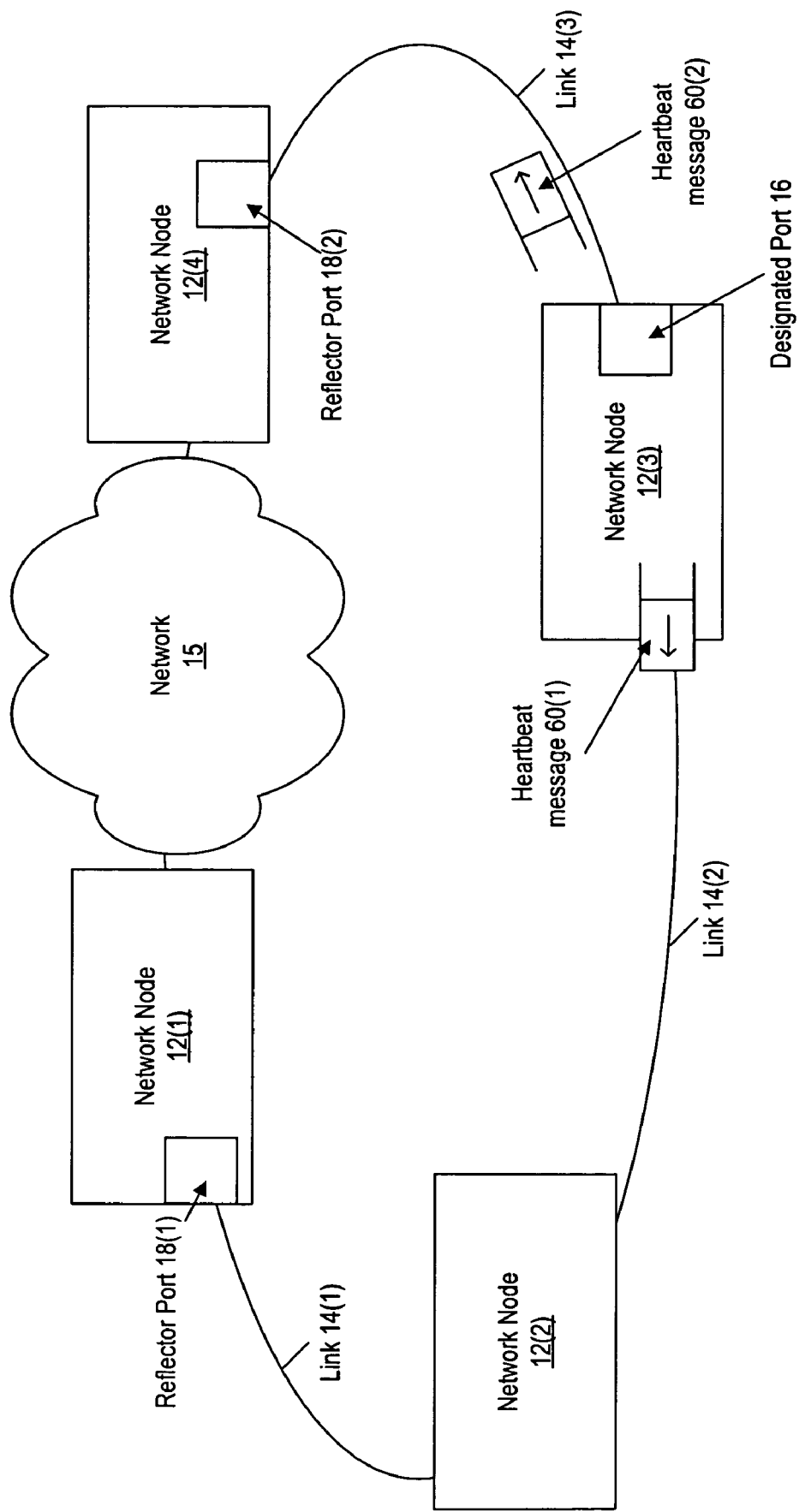
FIG. 5A illustrates how a designated port sends heartbeat messages in order to detect failures in a ring, according to one embodiment of the present invention.

FIG. 5A illustrates how a designated port sends ring protocol control messages in order to detect failures in a ring. As shown, designated port 16 sends a pair of heartbeat messages 60(1) and 60(2). Designated port 16 sends one heartbeat message in each direction on ring network 10. The arrow within each heartbeat message indicates the direction in which each heartbeat is being sent.

Designated port 16 sends heartbeat message 60(1) to another ring port within network node 12(3). This other ring port (not shown) is coupled to network link 14(2). In response to receiving the heartbeat message, that ring port outputs the heartbeat message on link 14(2). Similarly, designated port 16 sends heartbeat message 60(2) on link 14(3) to network node 12(4).

Heartbeat messages are special ring protocol control messages that are simply passed from network node to network node around the ring. Designated port 16 uses heartbeat messages to detect whether ring 10 is complete. Designated port 16 sends one heartbeat message in each direction on ring network 10. If both messages are returned to designated port 16 within a timeout period, designated port 16 determines that the ring is complete; otherwise, designated port 16 determines that the ring is incomplete. Designated port 16 blocks data traffic if the ring is complete and unblocks (thus allowing data traffic) if the ring is incomplete.

A network node that does not include a designated port or a reflector port receives a heartbeat message via one ring port and then resends that heartbeat message from a paired ring port. For example, in response to receiving heartbeat message 60(1) via link 14(2), network node 12(2) simply resends heartbeat message 60(1) (e.g., by sending a copy of heartbeat message 60(1)) via link 14(1). In this way, heartbeat messages 60(1) and 60(2) are propagated around ring network 10 until they reach reflector ports 18(1) and 18(2), respectively (assuming no failures between the designated port and the reflector ports).

Figure 5B:
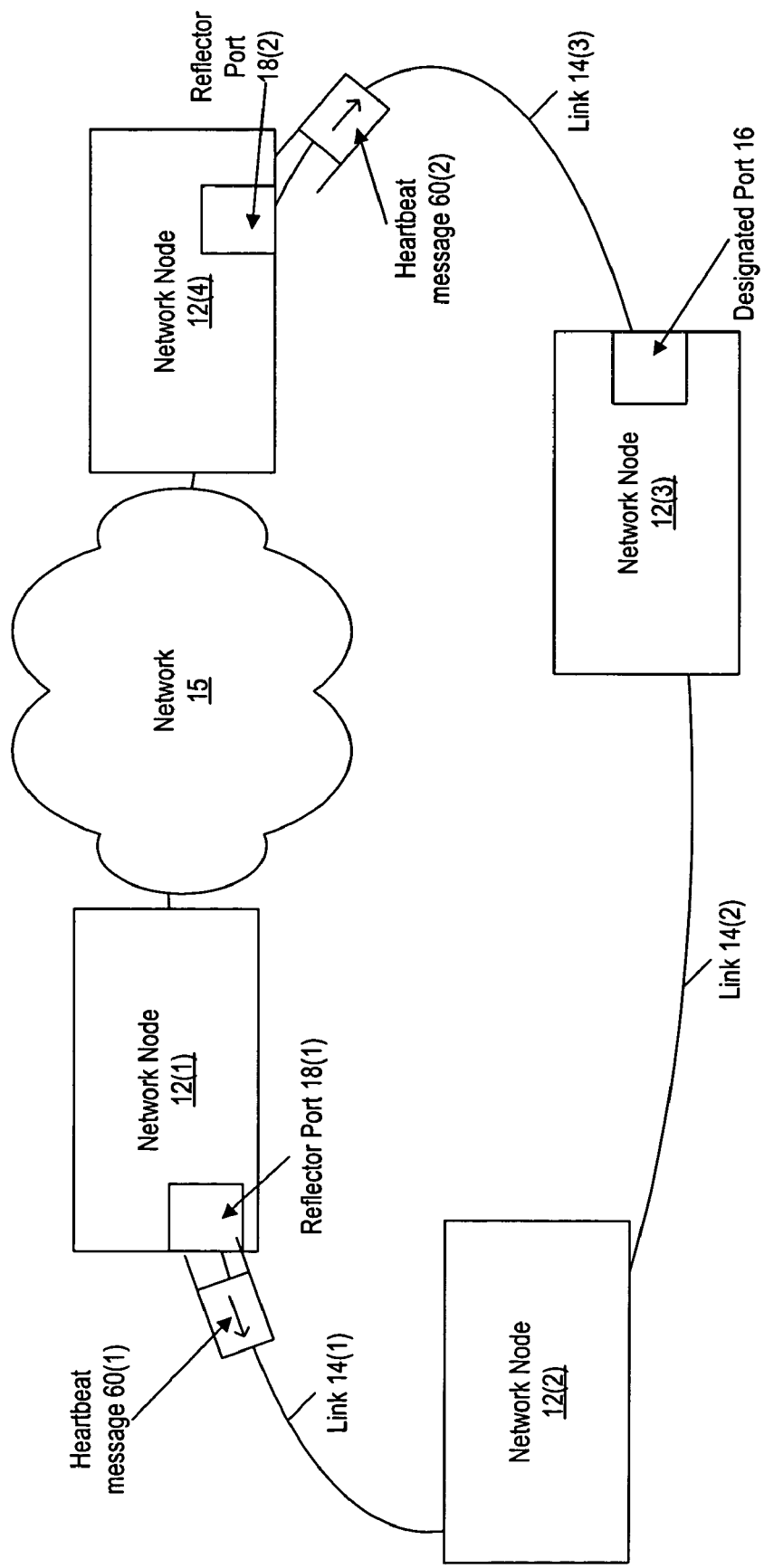
FIG. 5B illustrates how reflector ports can "reflect" the heartbeat messages so that the designated port will perceive the ring as being unbroken, according to one embodiment of the present invention.

FIG. 5B illustrates how reflector ports can "reflect" the ring protocol control messages so that the designated port will perceive the ring as being unbroken. As shown, in response to receiving heartbeat messages 60(1) and 60(2), network nodes 12(1) and 12(4) resend these messages (e.g., by outputting copies of these messages) from reflector ports 18(1) and 18(2) respectively. The heartbeat messages then propagate back to designated port 16, causing designated port 16 to detect that ring network 10 is complete, even though a section of ring network 10 has actually been replaced by network 15.

Figure 6:
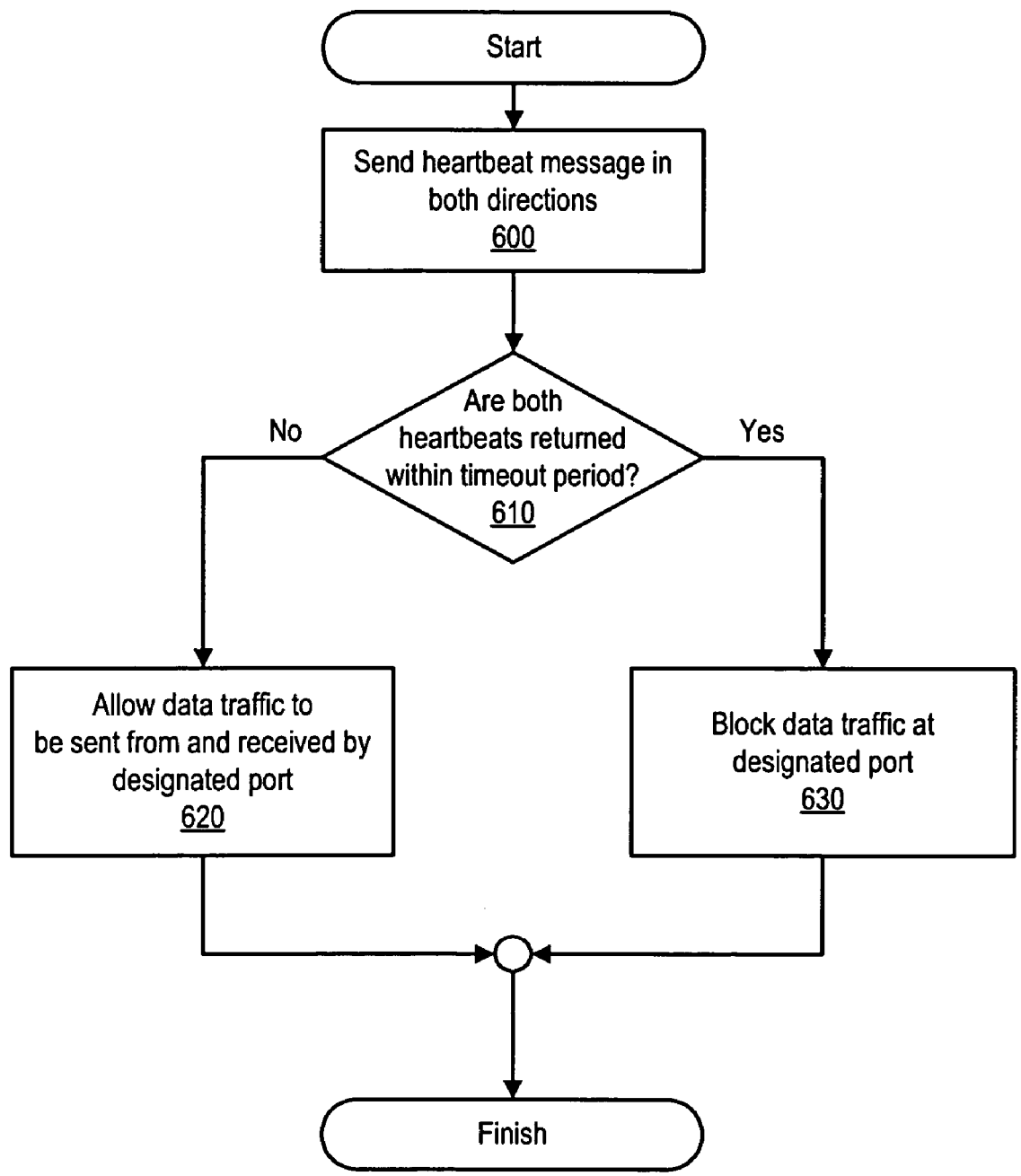
FIG. 6 is a flowchart of a method of operating a designated port, according to one embodiment of the present invention.

FIG. 6 is a flowchart of a method of operating a designated port. The method begins at 600, when the designated port sends special ring protocol control messages, called heartbeat messages, in both directions on the ring (this function can be performed in response to the ring protocol selecting one of several ports as the designated port). The designated port sends the heartbeat messages in order to detect whether the ring is currently complete or not.

Based on whether both heartbeat messages are returned to the designated port within a timeout period, as detected at 610, the designated port will determine whether the ring is currently complete. If the ring is currently broken (as determined by one or more of the heartbeat messages not being returned within the timeout period), the designated port will not block, as shown at 620, allowing data traffic to be sent from and received by the designated port.

If both heartbeat messages are received by the designated port within the timeout period, the designated port will begin blocking, as indicated at 630. When blocking, the designated port will neither send (either externally on the ring network or internally to another ring port within the same network device as the designated port) nor receive any data traffic. The designated port can block by discarding any received data messages. It is noted that since the heartbeat messages are control traffic, not data traffic, they are not blocked by the designated port.

In some embodiments, another type of ring protocol control message, referred to as a failure message, can also be used to detect ring failures. For example, a ring port can send a failure message in response to failing, detecting that a partner ring port within the same network device has failed, detecting that a neighboring ring port has failed, or detecting that a link coupling the ring port to the neighboring ring port has failed. In response to receiving a failure message, the designated port can also cease to block data traffic (e.g., until the use of heartbeat messages again detects a complete ring). Thus, in embodiments that support failure messages, the designated port can base its determination of whether to block or allow data traffic on both heartbeat messages and failure messages. Such failure messages are not reflected by a reflector port.

At least some of the functions shown in FIG. 6 can be repeated one or more times. For example, during normal operation in a complete ring, the designated port can periodically repeat functions 600-630. Furthermore, if a designated port stops blocking (due to detecting a failure in the ring, either due to an unreturned heartbeat message or a received failure message), the designated port can periodically send heartbeat messages (function 600) and monitor their return (function 610) in order to detect when the failure(s) within the ring are repaired.

Figure 7:
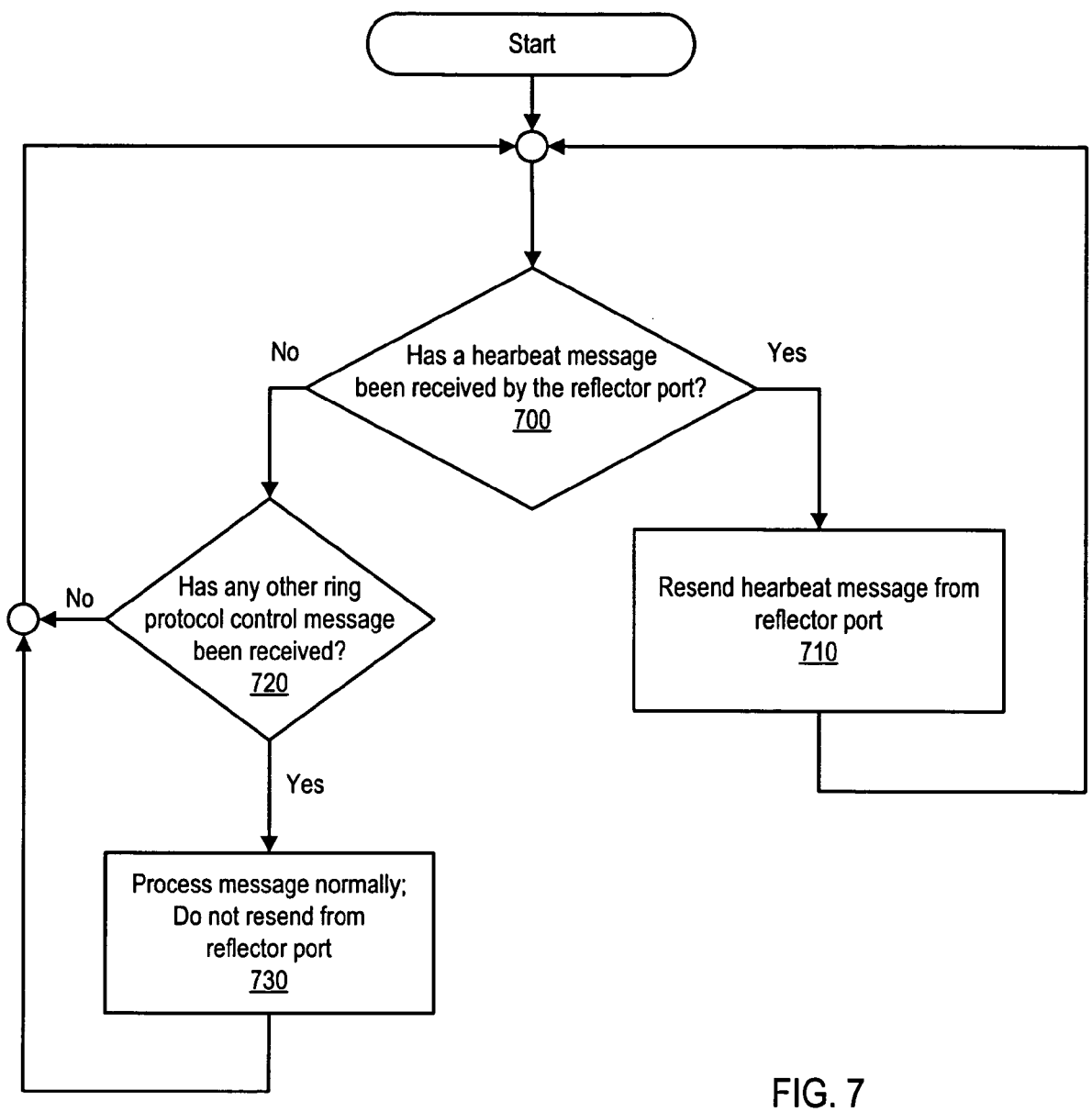
FIG. 7 is a flowchart of a method of operating a reflector port, according to one embodiment of the present invention.

FIG. 7 is a flowchart of a method of operating a reflector port. This method can be performed by a reflector module such as reflector module 20 of FIG. 2. The method begins at function 700, which detects whether a heartbeat message has been received via a reflector port. If a heartbeat message has been received via the reflector port, the heartbeat message is then resent from the reflector port, as shown at 710. By resending the heartbeat message, the reflector port causes the heartbeat message to be propagated back towards the designated port. If any other type of ring protocol control message (other than a heartbeat message) is received by the reflector port, as detected at 720, the message is processed normally and not resent from the reflector port, as shown at 730. Functions 710-730 can be repeated one or more times.

While the above examples have shown situations in which the reflector ports are separate from the designated port, alternative embodiments can include a port that is both a reflector port and a designated port. In those embodiments, since the combination reflector and designated port is located at the end of the daisy chain, the designated port will only send and receive one ring protocol control message over the ring network when checking to see if the ring network is complete. In most situations, the designated port will be selected to be between the endpoints of the daisy chain (i.e., the designated port will not also be a reflector port), since such a configuration provides more balanced traffic flow by breaking the ring into two logical segments when the designated port is blocking.

Throughout this disclosure, the term "message" is used to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

Figure 8:
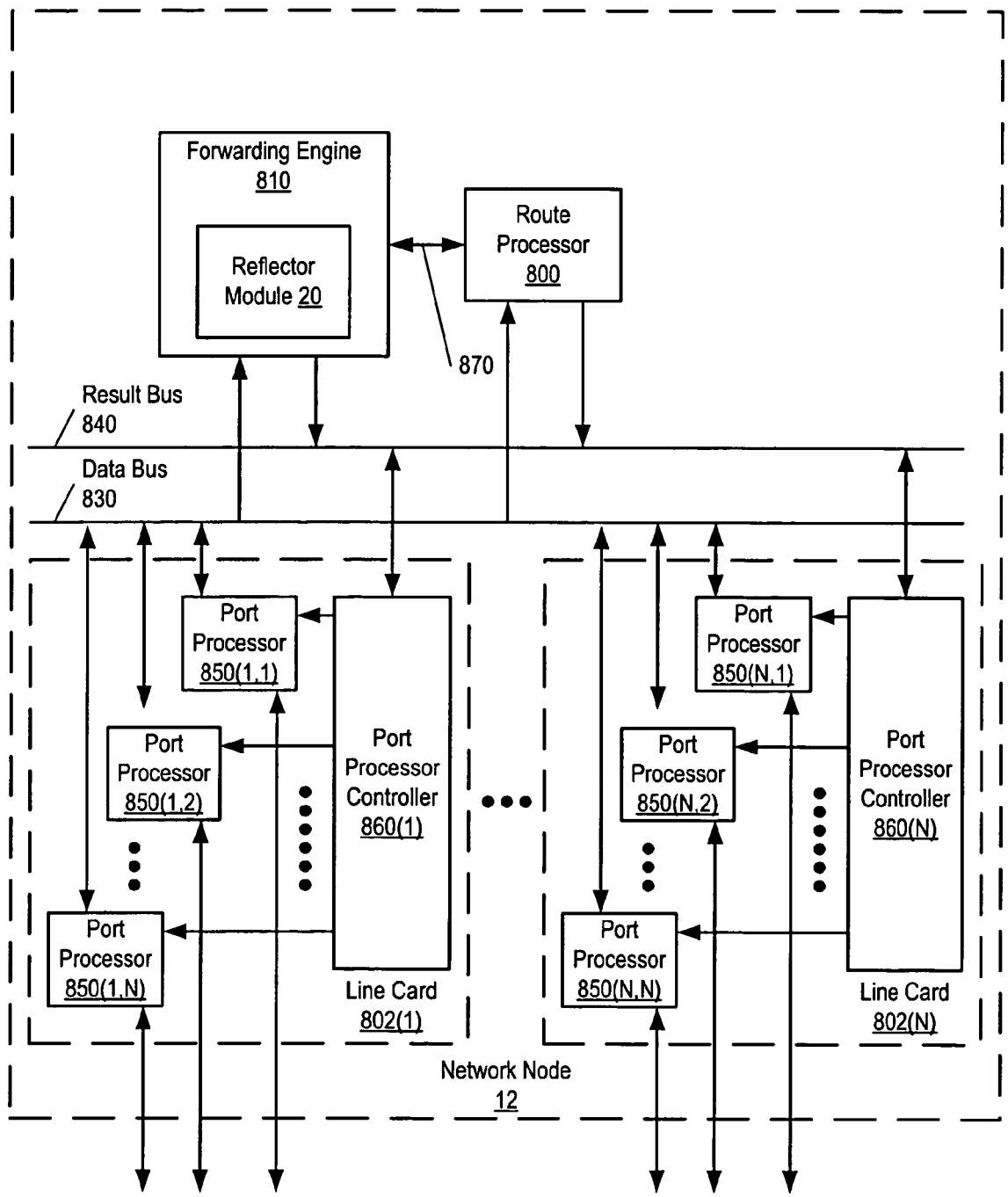
FIG. 8 shows a block diagram of a network device that can implement a reflector port, according to one embodiment of the present invention.

FIG. 8 shows a block diagram of a network device that can implement a reflector port. FIG. 8 is a block diagram of a network node 12 (e.g., one of network nodes 12(1)-12(4) of FIGS. 1, 2, 3, 4, 5A, and 5B). In this depiction, network node 12 includes a number of line cards (line cards 802(1)-802(N)) that are communicatively coupled to a forwarding engine 810 and a route processor 800 via a data bus 830 and a result bus 840. Line cards 802(1)-802(N) include a number of port processors 850(1,1)-850(N,N) which are controlled by port processor controllers 860(1)-860(N). It will also be noted that forwarding engine 810 and route processor 800 are not only coupled to one another via data bus 830 and result bus 840, but are also communicatively coupled to one another by a communications link 870. It is noted that in alternative embodiments, each line card can include a forwarding engine.

When a packet is received, the packet is identified and analyzed by a network device such as network node 12 in the following manner, according to embodiments of the present invention. Upon receipt, a packet (or some or all of its control information) is sent from the one of port processors 850(1,1)-850(N,N) at which the packet was received to one or more of those devices coupled to data bus 830 (e.g., others of port processors 850(1,1)-850(N,N), forwarding engine 810 and/or route processor 800). Handling of the packet can be determined, for example, by forwarding engine 810. For example, forwarding engine 810 may determine that the packet should be forwarded to one or more of port processors 850(1,1)-850(N,N). This can be accomplished by indicating to corresponding one(s) of port processor controllers 860(1)-860(N) that the copy of the packet held in the given one(s) of port processors 850(1,1)-850(N,N) should be forwarded to the appropriate one of port processors 850(1,1)-850(N,N).

In the example of FIG. 8, one or more (e.g., a pair) of port processors 850(1,1)-850(N,N) can be configured as ring ports for the same ring network. If one of these ring ports is configured as a reflector port, reflector module 20, which is implemented by forwarding engine 810, will cause that reflector port to resend certain ring protocol control messages onto the ring network. For example, if port processor 850(1,1) is configured as a reflector port (e.g., as indicated by the value of state information associated with port processor 850(1,1)), port processor 850(1,1) can generate an interrupt in response to receiving a ring protocol control message. In response to the interrupt, reflector module 20 can verify that the ring protocol control message is a type of ring protocol control message that is used to detect ring completeness. If so, reflector module 20 causes port processor 850(1,1) to resend the ring protocol control message on the ring. Reflector module 20 can also modify the ring protocol control message before resending it, if modifications are needed. In alternative embodiments, reflector module 20 can be implemented within a port processor controller (e.g., one of port processor controllers 660(1)-660(N)).

Figure 9:
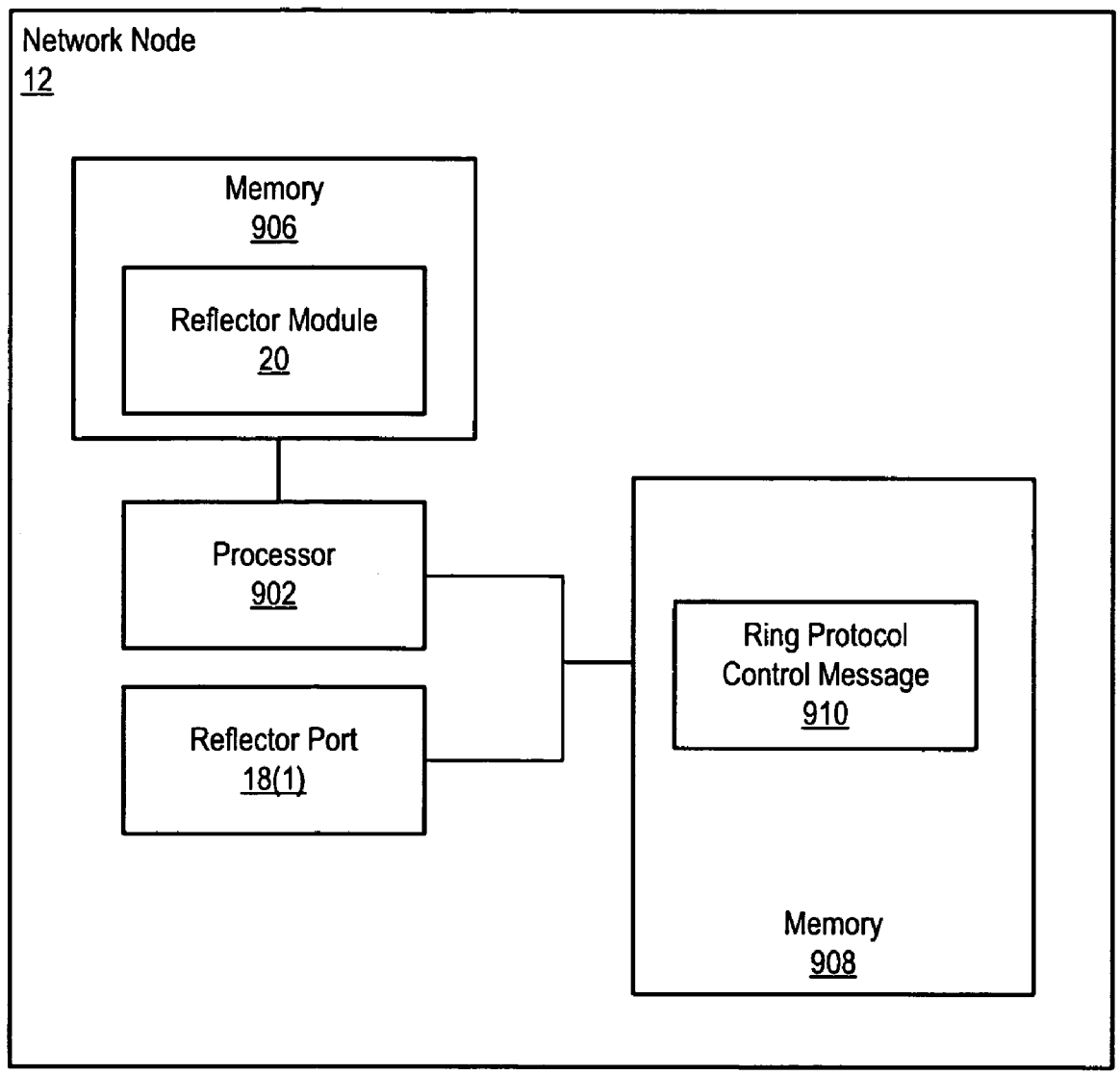
FIG. 9 is a block diagram of a network device that can use software to implement a reflector port, according to one embodiment of the present invention.

FIG. 9 is another block diagram of network node 12, which illustrates how reflector module 20 can be implemented in software. As illustrated, network node 12 includes one or more processors 902 (e.g., microprocessors, PLDs (Programmable Logic Devices), or ASICs (Application Specific Integrated Circuits)) configured to execute program instructions stored in memory 906. Memory 906 can include various types of RAM (Random Access Memory), ROM (Read Only Memory), Flash memory, MEMS (Micro Electro-Mechanical Systems) memory, and the like. Processor 902 and memory 906 can be included in a port processor (e.g., port processors 850(1,1)-850(N,N) of FIG. 8), a port processor controller (e.g., port processor controllers 860(1)-860(N)), a forwarding engine (e.g., forwarding engine 810 of FIG. 8), or a route processor (e.g., route processor 800 of FIG. 8). Processor 902 and memory 906 are coupled to send and receive data and control signals by a bus or other interconnect.

Network node 12 also includes a reflector port 18 (e.g., one of reflector ports 18(1) and 18(2) of FIG. 1). Reflector port 18 is a ring port that has been configured (e.g., through the use of state information associated with the ring port) as a reflector port. In response to receiving a ring protocol control message, reflector port 18 stores a copy of the ring protocol control message 910 in memory 908. Reflector port 18 also notifies reflector module 20 that a ring protocol control message has been received. Reflector module 20 can then access the ring protocol control message (e.g., to determine whether the message is a heartbeat message) and, if needed, cause reflector port 18 to resend the received ring protocol control message on the ring network. Processor 902, reflector port 18, and memory 908 are coupled to send and receive data and control signals by a bus or other interconnect.

In this example, program instructions executable to implement reflector module 20 are stored in memory 906. The program instructions and data implementing reflector module 20 can be stored on various computer readable media such as memory 906. In some embodiments, reflector module software is stored on a computer readable medium such as a CD (Compact Disc), DVD (Digital Versatile Disc), hard disk, optical disk, tape device, floppy disk, and the like). In order to be executed by processor 902, the instructions and data implementing reflector module 20 are loaded into memory 906 from the other computer readable medium. The instructions and/or data implementing reflector module 20 can also be transferred to network node 12 for storage in memory 906 via a network such as the Internet or upon a carrier medium. In some embodiments, a computer readable medium is a carrier medium such as a network and/or a wireless link upon which signals such as electrical, electromagnetic, or digital signals, on which the data and instructions implementing reflector module 20 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising:
   a first network node at a first end of a daisy chain of serially interconnected network nodes;
   a second network node at a second end of the daisy chain of network nodes; and
   a network coupling the first network node and the second network node, wherein
   the network is not part of the daisy chain of serially interconnected network nodes,
   the first network node comprises a first reflector port coupled to the daisy chain,
   the second network node comprises a second reflector port coupled to the daisy chain,
   the first network node is configured to detect reception of a first ring protocol control message by the first reflector port, wherein
   the first ring protocol control message is generated by a designated port within the daisy chain, and
   the first ring protocol control message is sent from the designated port to the first node,
   the second network node is configured to detect reception of a second ring protocol control message by the second reflector port, wherein
   the second ring protocol control message is generated by the designated port, and
   the second ring protocol control message is sent from the designated port to the second node,
   the first network node is configured to resend the first ring protocol control message from the first reflector port back to the designated port instead of sending the first ring protocol control message to the second network node via the network, and
   the second network node is configured to resend the second ring protocol control message from the second reflector port back to the designated port instead of sending the second ring protocol control message to the first network node via the network.

2. The system of claim 1, wherein
   the first ring protocol control message is a type of message that is used to detect whether a ring network is complete.

3. The system of claim 2, wherein
   the network comprises a second daisy chain of nodes, and
   an end node of the second daisy chain of nodes comprises a reflector port.

4. The system of claim 2, further comprising:
   a third network node, wherein
   the third network node is coupled between the first network node and the second network node in the daisy chain,
   the third network node comprises the designated port, and the designated port is configured to inhibit data traffic from being sent from and received by the designated port, if a heartbeat message sent by the designated port is returned to the designated port within a timeout period.

5. The system of claim 4, wherein
the designated port is configured to only inhibit data traffic if two heartbeat messages sent by the designated port are returned to the designated port within the timeout period.

6. A first network node, comprising:
a reflector port, wherein
the reflector port is configured to be coupled to an end of a daisy chain of serially interconnected network nodes,
the first network node is configured to be coupled to a second network node via a network,
the network is not part of the daisy chain of serially interconnected network nodes; and
a reflector module coupled to the reflector port, wherein
the reflector module is configured to resend a first ring protocol control message from the reflector port to a designated port within the daisy chain instead of sending the first ring protocol control message to the second network node via the network, in response to detecting reception of the first ring protocol control message by the reflector port,
the second network node is configured to resend a second ring protocol control message from a second reflector port to the designated port instead of sending the second ring protocol control message to the first network node via the network, in response to detection of the second ring protocol control message by the second network node, and
the first and second ring protocol control messages originate from the designated port.

7. The network node of claim 6, wherein
the first ring protocol control message is a type of message that is used to detect whether a ring network is complete.

8. The network node of claim 7, wherein
the reflector module is configured to modify the first ring protocol control message before resending the first ring protocol control message from the reflector port.

9. The network node of claim 7, wherein
the reflector port is configured to receive a third ring protocol control message,
the third ring protocol control message is not a type of message that is used to detect whether a ring network is complete, and
the reflector module does not resend the third ring protocol control message via the reflector port.

10. A method comprising:
generating a first and second ring protocol control message, wherein
the first and second ring protocol control messages are generated by a designated port within a daisy chain of serially interconnected network nodes;
sending the first ring protocol control message from the designated port to a first node;
sending the second ring protocol control message from the designated port to a second node;
receiving the first ring protocol control message via a reflector port, wherein
the reflector port is coupled to an end of the daisy chain of serially interconnected network nodes; and
resending the first ring protocol control message from the reflector port back to the designated port instead of sending the first ring protocol control message to the second node via a network, wherein
the network is not part of the daisy chain of serially interconnected network nodes, and
the second node is configured to resend the second ring protocol control message from a second reflector port back to the designated port instead of sending the second ring protocol control message to the reflector port via the network.

11. The method of claim 10, wherein
the first ring protocol control message is a type of message that is used to detect whether a ring network is complete.

12. The method of claim 11, further comprising:
receiving a third ring protocol control message via the reflector port, wherein
the third ring protocol control message is not a type of message that is used to detect whether a ring network is complete, and
the third ring protocol control message is not re-sent from the reflector port onto the daisy chain.

13. The method of claim 11, further comprising:
identifying whether a ring failure has occurred based on whether the first ring protocol control message is returned to the designated port within a predesignated amount of time.

14. The method of claim 13, further comprising:
sending a pair of heartbeat messages from the designated port, wherein
the pair of heartbeat messages are sent at substantially the same time, and
the pair of heartbeat messages comprises the first ring protocol control message; and
identifying that the ring failure has occurred if fewer than both of the pair of heartbeat messages are returned to the designated port within the predesignated amount of time.

15. A method comprising:
receiving a ring protocol control message via a reflector port, wherein
the reflector port is coupled to an end of a daisy chain of network nodes;
resending the ring protocol control message from the reflector port onto the daisy chain of network nodes, wherein
the ring protocol control message is a type of message that is used to detect whether a ring network is complete;
sending the ring protocol control message from a designated port;
identifying whether a ring failure has occurred based on whether the ring protocol control message is returned to the designated port within a predesignated amount of time;
sending a pair of heartbeat messages from the designated port, wherein
the pair of heartbeat messages are sent at substantially the same time, and
the pair of heartbeat messages comprises the ring protocol control message; and
identifying that the ring failure has occurred if fewer than both of the pair of heartbeat messages are returned to the designated port within the predesignated amount of time.

* * * * *